United States Patent [19]
Hackleman

[11] Patent Number: 5,742,305
[45] Date of Patent: Apr. 21, 1998

[54] PWA INKJET PRINTER ELEMENT WITH RESIDENT MEMORY

[75] Inventor: David E. Hackleman, Monmouth, Oreg.

[73] Assignee: Hewlett-Packard, Palo Alto, Calif.

[21] Appl. No.: 376,320

[22] Filed: Jan. 20, 1995

[51] Int. Cl.$^6$ ............................................. B41J 2/155
[52] U.S. Cl. ................................ 347/42; 347/12; 347/13
[58] Field of Search .............................. 347/13, 42, 43, 347/9, 12, 15, 57, 58, 180–182, 131

[56] References Cited

U.S. PATENT DOCUMENTS

| | | | |
|---|---|---|---|
| 5,016,023 | 5/1991 | Chan et al. | 347/42 |
| 5,357,268 | 10/1994 | Kishida et al. | 347/13 |

*Primary Examiner*—Benjamin R. Fuller
*Assistant Examiner*—Craig A. Hallacher

[57] ABSTRACT

An inkjet page-wide-array "PWA" printer element includes memory resident on its printbar. The printbar memory offloads an otherwise excessive PWA printhead data throughput requirement enabling print speed to approach nozzle speed. Instead of transferring dot data from printer memory directly to printhead nozzle circuitry, dot data is first transferred from printer memory to printbar memory. Dot data then is transferred from printbar memory to the nozzle circuitry. Printbar memory is organized as a plurality of memory planes (i.e., 2 or more). Each plane stores dot data for one or more dot lines. For a 20 kHz nozzle speed, 600 dpi resolution, and an 11 inch printhead, dot data is transferred from printer memory to the printbar memory's first plane at a rate less than 140 MHz. Dot data then is transferred from the first plane to the second plane in one parallel transfer. For a two-plane embodiment dot data then is output from the second plane to respective nozzles to sustain printing at nozzle speed. A multiplexer data path between the second memory plane and the firing circuitry enables output of dot data for multiple nozzles at a time so that an approximately 20 MHz data rate sustains printing at the nozzle speed.

11 Claims, 4 Drawing Sheets

PWA INKJET PRINTER ELEMENT WITH RESIDENT MEMORY

BACKGROUND OF THE INVENTION

This invention relates generally to inkjet printhead and printer element construction, and more particularly, to a page-wide-array ("PWA") inkjet printer element with resident memory for improving print speed.

A PWA inkjet printer element is analogous to the pen body of a conventional inkjet scanning printhead. Like the pen body, the PWA printer element includes an ink supply and defines a printhead having a plurality of inkjet nozzles. Each nozzle is formed by a nozzle chamber, firing resistor and orifice. The firing resistor is located within the chamber. During operation, the nozzle chamber receives ink from the ink source. The firing resistor then is activated causing an ink droplet to be fired from the chamber through the orifice onto a media sheet (e.g., paper, transparency). The printhead of a PWA printer element, however, has more than 5,000 nozzles extending the length of a pagewidth, while that of a conventional pen body has approximately 100–200 nozzles extending a distance of approximately 0.15 to 0.50 inches. Also, the printer element nozzles are controlled to print one or more lines at a time, while the pen body nozzles are controlled to print multiple characters at a time. The pen body does not extend far enough across the page or have enough nozzles to print an entire line across a page at a time. Also, the printer element is fixed as it prints a line of dots, while the pen body scans across a page to print its dots.

Inkjet nozzles are formed on a substrate in which several layers define multiple nozzle chambers and corresponding firing resistors. The substrate and layer qualities and dimensions are selected to achieve desired thermodynamic and hydrodynamic conditions within each nozzle. Various commonly-assigned patents teach aspects of nozzle fabrication, including U.S. Pat. No. 4,513,298 (Scheu); U.S. Pat. No. 4,535,343 (Wright et al.); U.S. Pat. No. 4,794,410 (Taub et al.); U.S. Pat. No. 4,847,630 (Bhaskar et al.); U.S. Pat. No. 4,862,197 (Stoffel); and U.S. Pat. No. 4,894,664 (Tsung Pan).

A PWA printer element includes a printbar having a reservoir for holding an ink supply. The printbar also defines a printhead surface. The printhead extends across an entire pagewidth, is fixed in position and includes more than 5000 nozzles. For an 11 inch printhead with 600 dpi precision there are at least 6600 nozzles. Because the PWA printhead has thousands more nozzles than a pen body and prints one or more lines at a time, there are substantially more timing and control signals generated at a given time. To print multiple lines as opposed to multiple characters, the firing of thousands more nozzles has to be controlled. Signals have to be transmitted to the thousands more firing resistors of such nozzles. Accordingly, the PWA printhead has a substantially higher data throughput requirement than the smaller, scanning pen body's printhead.

The PWA printhead signal timing and data throughput can be constraints limiting the print speed. For example, to keep up with a conventional 20 kHz nozzle speed and print with 600 dpi resolution with a maximum ¼ dot error along a line across the page, a PWA printer element receiving timing and control signals direct from a print processor and processor-board or add-in board memory needs to sustain a throughput of approximately 528 MHz. Achieving and maintaining such a high data rate is a difficult task. Accordingly, there is need for a more effective architecture capable of sustaining nozzle speed with an easier to achieve data throughput.

According to a conventional inkjet printer architecture for a scanning printhead, nozzle firing is controlled via a print processor and printer memory. Conventional designs include memory on the processor board and/or on add-in memory cards. Such memory is referred to herein as "printer memory." Typically, print data is received from a host computer and stored in printer memory. The print processor then reads the print data and converts the data into dot data. Dot data as used herein means a data format corresponding to the dot pattern to be printed to achieve media sheet markings corresponding to given input data. To fire a resistor dot data is read from memory, and a signal is sent to the pen body and printhead. Specifically, the dot data originates from printer memory, which is located away from the printhead on the processor board and/or add-in card. A fixed PWA printhead using such architecture requires an excessively high data throughput to sustain nozzle speed. If nozzle speed cannot be sustained, then the print speed is less than maximum for a given nozzle technology.

To achieve high quality output the nozzle timing must be precise. There are several potential timing methods for printing to a media sheet as the sheet moves adjacent to a PWA printhead. According to one potential approach, the media sheet is stopped, while a line is printed. The media sheet then is moved to a new position and stopped for the next line. Such starting and stopping of the media sheet is performed relatively fast. For example, an 8.5×11 media sheet printed at 600 dpi resolution would be stopped and started at 5200 cycles per second (5.2 kHz). At a 5.2 kHz rate, however, a loud annoying undesirable audio signal would result. Thus, an alternative approach is desired.

According to another potential approach, the media sheet could be slowed to allow a column of dots to print within a tolerable error criteria. A conventional tolerable error is one-quarter dot misalignment among a line of dots spanning across a pagewidth. For an 11" PWA printhead with 600 dpi resolution, there are at least 6600 dots across 11 inches. If the paper can only move ¼ dot, then at 600 dpi, that is 1/2400 inches. Thus, to be within tolerance the paper can move no more than 1/2400 inches during the output of the 6600 dots. To be within tolerance and print at the nozzle speed (e.g., 20 kHz), then printing must occur at 20,000 dots/sec×1/600 inches per dot which is 33 inches/second. To print 1/2400 inch then requires 1/2400 inches ×1/33 seconds/inch, which is 12.5 microseconds. Thus, the 6600 nozzles need to be fired in 12.5 microseconds. This translates to a 528 MHz data rate. The printer thus would have to move dot data from printer memory to the PWA printhead nozzles at a 528 MHZ rate. Such a high throughput rate is undesirable making printing at nozzle speed difficult.

Accordingly, there is a need for a data transfer method capable of sustaining nozzle speed (e.g., 20 kHz per nozzle) across the entire PWA printhead at desired resolutions (e.g., 600 dpi).

SUMMARY OF THE INVENTION

According to the invention, an alternative print electronics architecture is adopted. In addition to a print processor with printer memory on the processor board and/or add-in board, memory also is included at the primer element. In particular, additional memory resides on the printbar of a page-wide-array ("PWA") printer element. Such additional memory is referred to herein as resident printbar memory or printbar memory. The printbar memory offloads an otherwise excessive PWA printhead data throughput requirement enabling nozzle speeds to be maintained across the entire printhead. Specifically, instead of transferring dot data from printer memory directly to printhead firing circuitry, dot data is first transferred from printer memory to printbar memory. Dot data then is transferred from printbar memory to the firing circuitry. With the dot data resident on the printbar, a page can move 1/600 inch before the next line is printed. A data rate of approximately 150 MHz worst case is able to sustain a 20 kHz nozzle speed for 600 dpi printing across a 12 inch printhead. Thus, print speed can occur at the nozzle speed. Without the resident printbar memory, it would be difficult to transfer data to the printhead fast enough to print at nozzle speed. An advantage of this invention is that the achievable print speed now is limited by the nozzle technology (and nozzle speed) or other printer attributes, but not by an inability to get dot data to the firing circuitry fast enough.

According to one aspect of the invention, the PWA printer element includes a printbar, a flexible printed circuit ("flex circuit"), nozzle circuitry and printbar memory. A PWA printhead having thousands of printbar nozzles is formed by a first surface of the printbar and attached nozzle circuitry and flex circuit. The nozzle circuitry includes multiple nozzle chambers, firing switches and firing resistors. The printbar memory is electronically coupled to the nozzle circuitry. During operation, a firing signal turns on a nozzle's firing switch which heats a firing resistor causing ink to be ejected through an orifice onto a media sheet.

According to another aspect of the invention, dot data is stored in printbar memory. Periodically dot data is output from printbar memory to the nozzle circuitry. The dot data indicates a given printhead nozzle either is to fire or not fire. Dot data which indicates that a nozzle is to fire is referred to as a firing signal.

According to another aspect of the invention, printbar memory is functionally organized as two or more memory planes. A first plane stores dot data received from printer memory. A second plane stores dot data to be output to the nozzle circuitry. Periodically, (i) dot data is moved from printer memory to the first plane, (ii) dot data is moved from the first plane to the second plane, and (iii) dot data is output from the second plane to the nozzle circuitry. The transfer processes for these three types of transfers vary.

According to another aspect of the invention, the first memory plane and second memory plane are coupled in parallel. In one embodiment each memory location of the first plane is directly coupled to a memory location in the second plane. For such embodiment, transfer of dot data from the first plane to the second plane is performed as one parallel transaction.

According to another aspect of the invention, the second memory plane is coupled via a parallel connection to the firing switches of each printhead nozzle. In one embodiment there are multiplexed data paths from the second memory plane to the nozzle circuitry. For example, a multiplexing scheme outputs one row of the second memory plane at a time, (e.g., 30 bits, 32 bits depending on memory configuration). Even a 20 MHz second plane memory throughput then can maintain a 20 kHz nozzle speed.

According to another aspect of the invention, each plane of the printbar memory stores dot data for every nozzle on the PWA printhead. More specifically, each plane has the capacity to store at any one time dot data for every printhead nozzle. In one embodiment, each plane has additional lookahead capacity for storing dot data for multiple lines of dot output at any one time. In a specific embodiment, each plane has lookahead capacity to store every nozzle's dot data for a look-ahead for the next prescribed number of dot lines (e.g., 0.2 inches of page would be 120 lines at 600 dpi).

According to another aspect of the invention, printing can occur at nozzle speed because dot data is available in the printbar memory in a timely fashion. For a nozzle speed of 20 kHz, for example, the printbar memory needs to move dot data to the nozzle circuitry at a 20 kHz rate per nozzle. Even with conventional memory chips operating at 20 MHz transfer rate, a 20 kHz / nozzle transfer rate is easily obtained via a fully parallel or multiplexed-parallel connection.

To support printing at nozzle speed, dot data needs to be moved from the first plane to the second plane before the next output of dot data for a given nozzle. As the next time a dot prints will be after the paper moves 1/600 inch, printing at 20 kHz nozzle speed means there are approximately 50 microseconds before the next print. With a parallel connection between the first plane and second plane, timely transfer of data between planes is easy to achieve within 50 microseconds. For memory having a 50–100 nano-seconds memory cycle 500–1000 transfers could occur. For a direct parallel connection between every location of the first memory plane and second memory plane, the transfer can occur in just one of those memory cycles.

To support printing at nozzle speed, dot data also needs to be moved from printer memory to the first plane before the next transfer of dot data out of the first plane to the second plane. With a fast transfer from the first memory plane to the second memory plane, substantially all of the 50 microseconds is available for moving a line of dot data from printer memory to the first memory plane. To move 6600 bits in 50 microseconds corresponds to a 132 MHz data rate. To move 7400 bits in 50 microseconds corresponds to a 150 MHz data rate. Such a transfer rate can be achieved with a conventional serial or parallel interface between printer memory and the first memory plane.

According to one embodiment of the invention data compression schemes are used to transfer dot data from printer memory to the first memory plane. For example, by overwriting the first memory plane only for changes in value fewer writes to the first memory plane need to occur during the 50 microseconds. Thus, a slower data rate could be used. Alternatively, the first memory plane is cleared in one memory cycle indicating no firings, then only dot data indicating to fire a nozzle is loaded. As the average image print job operates each nozzle at approximately a 30% duty cycle, 0.30×132 MHz which equals approximately 40 MHz, (or 0.30×150 MHz which equals 45 MHz), is an adequate transfer rate for image printing. As the average text print job operates each nozzle at approximately a 5% duty cycle, 0.05×132 which equals less than 7 MHz, (or 0.05×150 which equals 7.5 MHz), is an adequate transfer rate for text printing. By using lookahead capacity and conventional compression techniques, data throughput as low as 7 to 45 MHz can drive the printhead to a print speed equal to a 20 kHz nozzle speed.

One advantage of the invention is that the data throughput requirements needed to maintain print speed equal to nozzle speed are substantially reduced. Whereas a conventional design would require a worst case throughput from printer memory to firing resistors of approximately 528–592 MHz for a 20 kHz nozzle speed and 600 dpi resolution, embodiments of this invention achieve (i) a worst case throughput from printer memory to printbar memory of approximately 132–150 MHz, and (ii) throughput from resident printbar memory to firing resistors equal to the nozzle firing speed (e.g., 20 kHz). According to the invention, the presence of memory on the printbar means print speed is no longer limited by data throughput constraints, but by the nozzle technology and nozzle speed.

These and other aspects and advantages of the invention will be better understood by reference to the following detailed description taken in conjunction with the accompanying drawings.

DESCRIPTION OF SPECIFIC EMBODIMENTS

Inkjet Page-Wide-Array ("PWA") Printer Element

Figure 1:
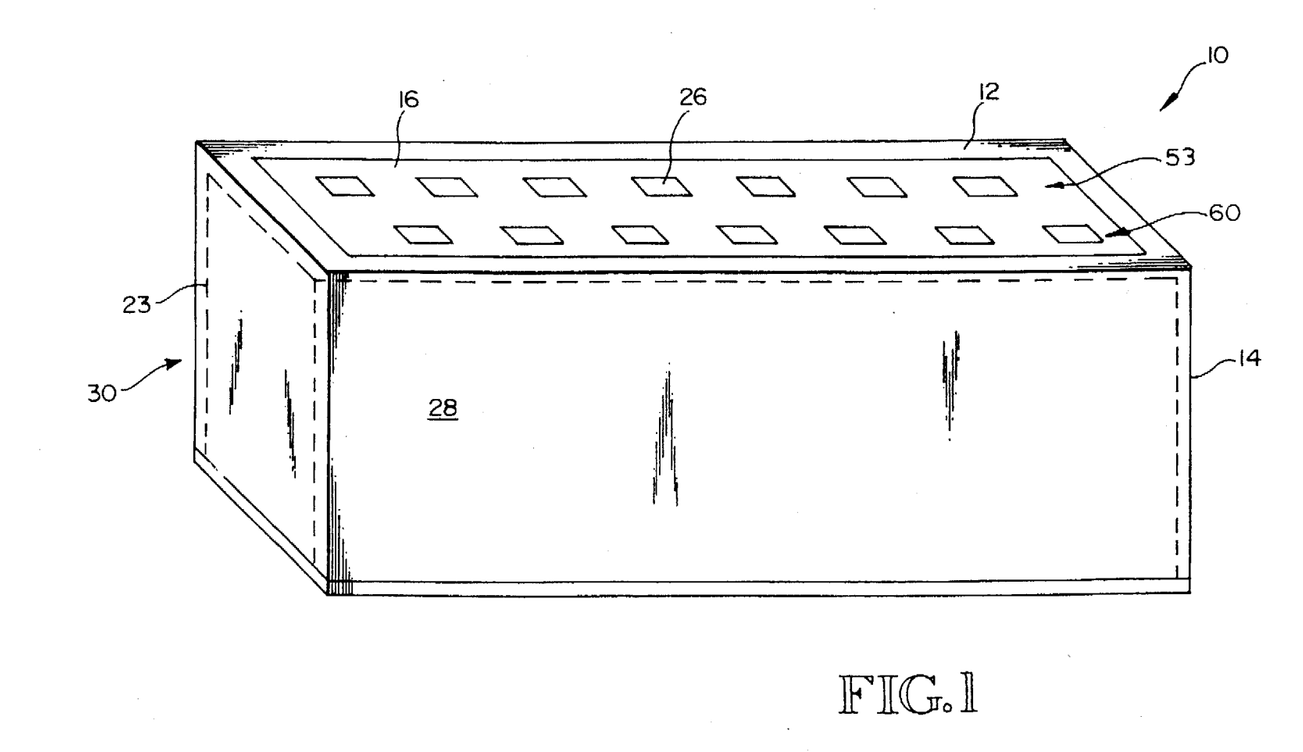
FIG. 1 is a perspective view of an inkjet page-wide-array printer element with resident memory according to an embodiment of this invention.

FIG. 1 shows an inkjet page-wide-array ("PWA") printer element 10 according to an embodiment of this invention. The printer element 10 extends at least a pagewidth in length (e.g., 8.5", 11" or A4) and ejects liquid ink droplets onto a media sheet. When installed in an inkjet printer, the printer element 10 is fixed, while the media sheet is fed adjacent to a printhead surface 12 of the printer element 10. As the media sheet moves relative to the PWA printhead 12, ink droplets are ejected from printhead nozzles 44 (see FIG. 4) to form markings representing characters or images. The PWA printhead 12 prints one or more lines of dots at a time across the pagewidth. The printhead 12 includes thousands of nozzles 44 across its length, but only select dots are activated at a given time to achieve the desired markings. A solid line for example, would be printed using all nozzles located between the endpoints of such line. An 11 inch printhead 12 with 600 dpi resolution has 6600 nozzles. A 12 inch printhead 12 with 600 dpi resolution has 7400 nozzles.

Figure 5:
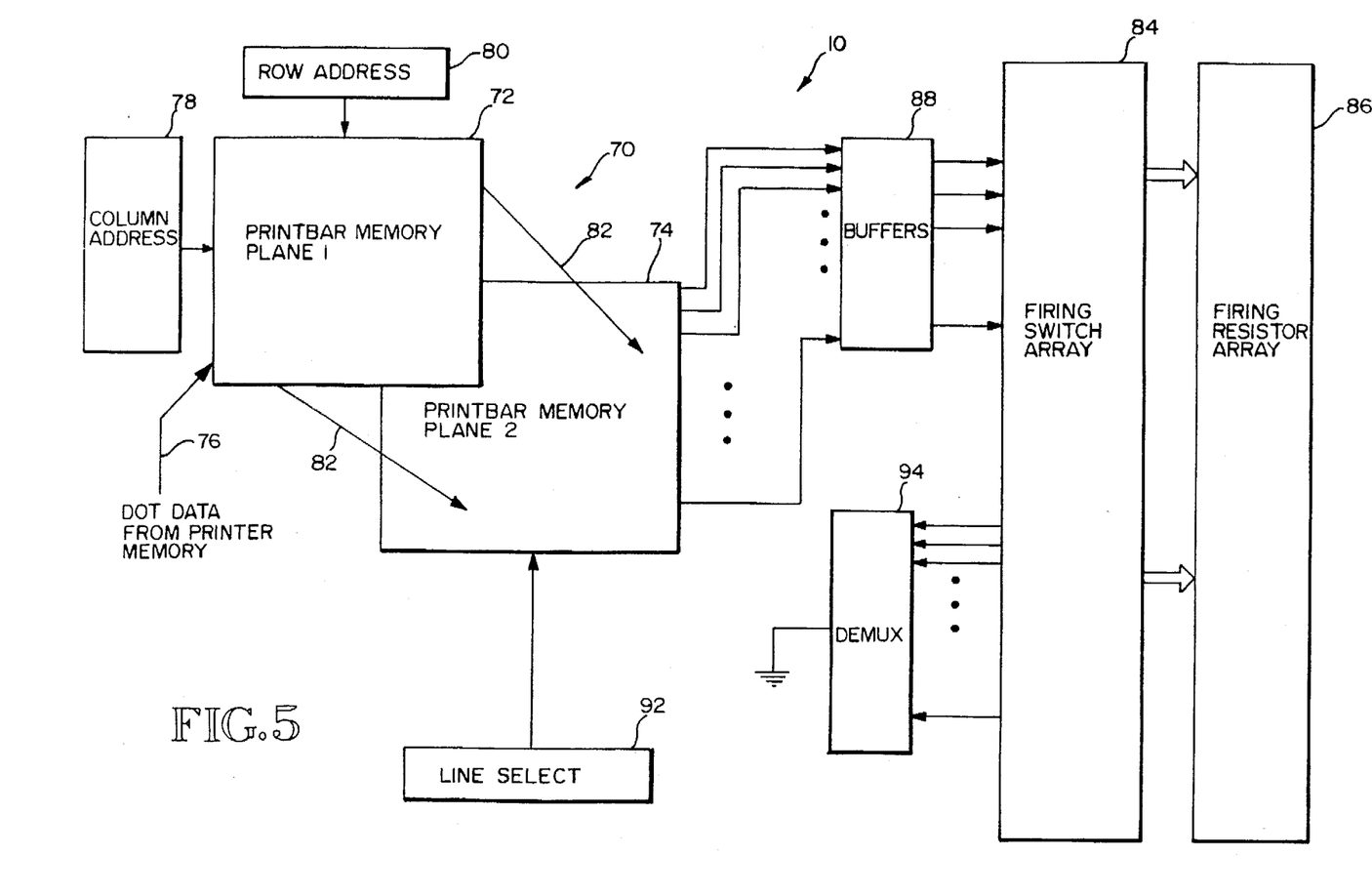
FIG. 5 is a diagram of printer element electronics for the printer element of FIG. 1 of FIG. 5.

The printer element 10 includes a printbar 14, a flexible printed circuit ("flex circuit") 16, nozzle circuitry (see FIGS. 3 and 5), and printbar memory 70 (see FIG. 5). The printhead 12 is formed by a first surface 22, the nozzle circuitry, printbar memory and the flex circuit 16. The printbar 14 serves as the printer element 10 body to which the other components are attached. In one embodiment the printbar 14 is approximately 12.5" by 1" by 2.5" and defines the first surface 22 to be approximately 12.5" by 1". The printbar 14 also defines an internal chamber 23 for holding an ink supply. In some embodiments the chamber 23 serves as a resident reservoir connected to an external ink source located within the printer but separate from the printer element 10.

Attached to the printbar 14 at the first surface 22 is the flex circuit 16. The flex circuit 16 is a printed circuit made of a flexible base material having multiple conductive paths, bonding slots and a peripheral connector. Conductive paths run from the peripheral connector (e.g., edge connector; button connector) to various bonding slots and from bonding slot to bonding slot. In one embodiment the flex circuit 16 is formed from a base material made of polyamide or other flexible polymer material (e.g., polyester, poly-methyl-methacrylate) and conductive paths made of copper, gold or other conductive material. The flex circuit 16 with the base material, conductive paths and bonding slots is available from the 3M Company of Minneapolis, Minn. The nozzle groups 26 and peripheral connector then are added.

Figure 2:
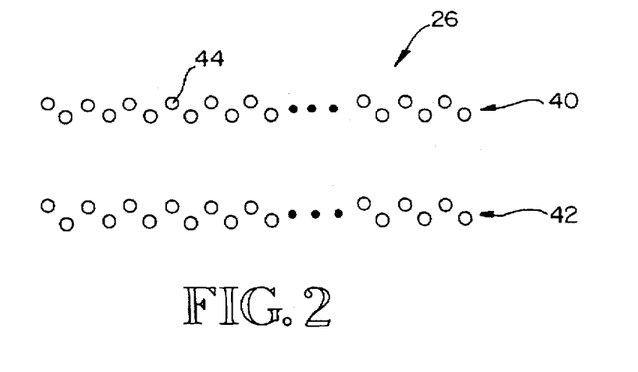
FIG. 2 is a planar view of a nozzle group for the printer element of FIG. 1.

FIG. 2 is a diagram of a nozzle group 26. Each nozzle group 26 includes two rows 40, 42 of printhead nozzles 44. The nozzles are formed on a silicon substrate attached to the flex circuit 16. Leads from the substrate couple to flex circuit conductors at bonding slots. In a specific embodiment of a 12 inch printhead 12 with 600 dpi resolution, there are 32 nozzle groups 26, and sixteen groups 26 per row 53, 60. Each group extends approximately 0.5 inches and is offset from adjacent groups 26 in the other row. Each nozzle group includes two rows 42, 44 of printhead nozzles 44. Each row includes at least 150 printhead nozzles 44. The nozzles 44 in a given row 42(44) are precisely aligned. Further the nozzles 44 in all rows 42(44) for all nozzle groups 26 of a row 53(60) are precisely aligned. Thus, there are four lines of nozzles 44 on the printhead 12 used for printing one line of dots. Extra length beyond, for example, an 11 inch pagewidth eases a sheet alignment constraint. In one embodiment approximately 7400 nozzles define a 12 inch PWA printhead for servicing an 11 inch pagewidth at 600 dpi resolution.

Figure 3:
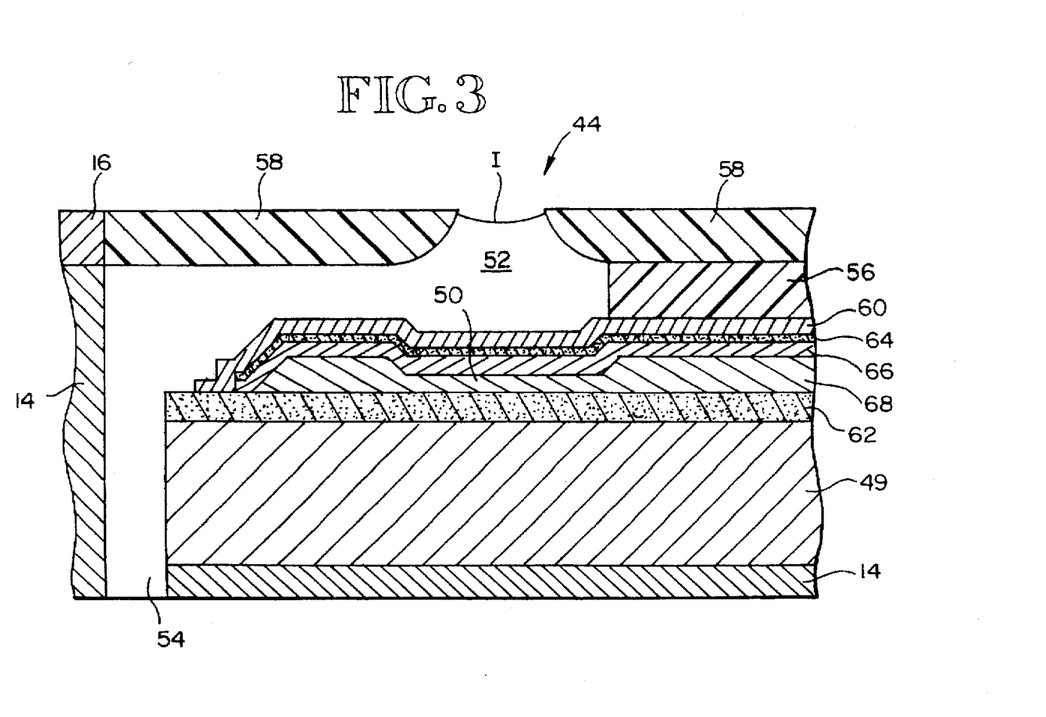
FIG. 3 is a diagram of a printhead nozzle for the printer element of FIG. 1.

FIG. 3 shows a printhead nozzle 44 loaded with ink I. In one embodiment a silicon substrate 49 with additional layers defines one or more nozzle groups 26 attached to the printbar 14 with the flex circuit 16. A nozzle 44 receives ink I from a printbar reservoir via a channel 54. The ink flows into a nozzle chamber 52. The nozzle chamber 52 is defined by a barrier film 56, a nozzle plate 58 and a passivation layer 60. Additional layers are formed between the substrate 49 and passivation layer 60, including insulative layers 62, 64, another passivation layer 66 and a conductive film 68. The conductive layer 68 defines the firing resistor 50.

In one embodiment the nozzle plate 58 is mounted to the flex circuit 16 with the nozzle circuitry. In another embodiment the flex circuit forms the nozzle plate 58. According to the flex circuit embodiment for the nozzle plate 58, respective orifices are laser drilled to achieve a precise area, orientation and position relative to the nozzle chambers 52.

The substrate 49 typically defines nozzle circuitry and printbar memory 70 for several nozzles. In one embodiment a substrate defines nozzle and memory circuitry for a given nozzle group 26. In another embodiment a substrate defines the same for multiple nozzle groups 26 (e.g., all groups 26; all groups 26 in a row 53, 60; some groups in one or more rows 53, 60).

Alternate PWA Printer Element Embodiment

Figure 4:
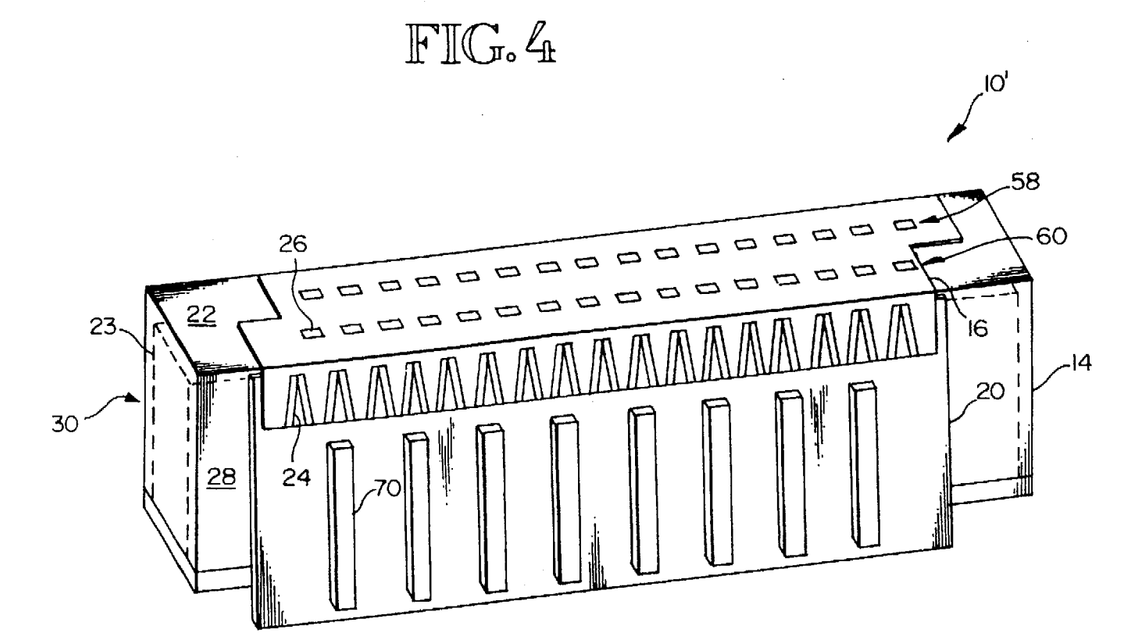
FIG. 4 is a perspective view of an inkjet page-wide-array printer element with resident memory according to an alternate embodiment of this invention.

According to an alternative embodiment as shown in FIG. 4, printbar memory 70 is located on separate printed circuit board(s) 20 attached to the printbar 14. The printer element 10 includes the printbar 14, flexible printed circuit ("flex circuit") 16, nozzle circuitry and memory printed circuit boards ("memory pcb(s)") 20.

The printhead 12 is formed by the first surface 22, the nozzle circuitry and the flex circuit 16. A memory pcb 20 is attached at a second surface 28, while another memory pcb 20 is attached at a third surface 30 opposite the second surface 28. In one embodiment the memory pcb's 20 are permanently attached using an adhesive, bonding, soldering, welding or other attachment process. In addition to being attached to the printbar 14, the memory pcb's 20 also are attached to the flex circuit 16. In one embodiment memory pcb contacts are in physical and electrical communication with respective peripheral contact groups 24 of the flex circuit 16. The memory pcb's 20 carry resident printbar memory 70. Conductive paths extend from the memory 70 to memory pcb contacts. Thus signal paths are defined from the memory 70 to the flex circuit 16 and printhead nozzles 44. In addition signal paths extend to a connector for interfacing to printer memory via a printer data bus or other connection.

Printer Element Electronics

FIG. 5 shows an electronic circuit diagram for the printer element 10. As shown printbar memory 70 is functionally organized into two or more planes 72, 74. A first memory plane 72 receives dot data 75 from printer memory (not shown) via input data path 76, column address lines 78 and row address lines 80. Periodically dot data is transferred from the first memory plane 72 to the second memory plane 74. In one embodiment, each one memory location in the first plane 72 is directly coupled via signal paths 82 to a corresponding one memory location in the second plane 74. The entire first plane 72 then is transferred to the second plane 74 in one or more parallel transactions in response to a select signal. In one embodiment, dot data is transferred from the first plane 72 to second plane 74 as one parallel transfer in response to a single select line request. In other embodiments dot data is transferred to the second memory plane 74 in plane sections or data blocks.

For the embodiment of FIG. 1, dot data is transferred from the second plane 74 to buffers 88, then to the array 84 of firing switches or directly to the array of firing switches. For the printer element of FIG. 4, the buffers 88 are located on the flex circuit 16. Dot data is transferred from memory to the buffers 88 then to the array 88 of firing switches. In various embodiments the firing switches are located on the substrate 49 attached to the flex circuit 16. In one embodiment of the FIG. 4 printer element 10', the firing switches are located on the flex circuit 16. Each firing switch 48 is coupled to a firing resistor 50 of resistor array 86. The firing resistors 50 are located in the nozzle chambers of the printhead nozzles 44. The firing resistors 50 and firing switches 48 are tied to ground via demultiplexed signal paths at demultiplexer 94.

Dot data is stored in the first plane 72 for every printhead nozzle 44. Dot data also is stored in the second plane 74 for every printhead nozzle 44. In one embodiment each plane 72, 74 has capacity for storing dot data for one line of more than 6600 dots (i.e., capacity for every nozzle). In another embodiment each plane 72, 74 has capacity for storing dot data for 0.2 inch of print lines. At 600 dpi, 0.2 inches equals 120 lines. Thus, each plane 72, 74 has capacity for at least 6600×120=792,000 items of dot data.

Nozzle Firing Method

During a normal print job, image data, text data or data of another format is output from a host computer to printer memory of a PWA inkjet printer. A print processor converts the received data into "dot data." Dot data as used herein means a data format corresponding to the dot pattern to be printed to achieve media sheet markings corresponding to given input data. Dot data for a given nozzle is one bit having a first logic state indicating the nozzle is to fire ink or a second logic state indicating the nozzle is not to fire ink. The dot define defines lines of dot data. Each line of dot data corresponds to the firing state of each of the at least 6600 nozzles for a given time. A current dot line thus will have at least 6600 entries with between 0 and 6600 of the entries having a first logic state indicating to fire a corresponding nozzle. If all 6600 entries are at the first logic state then a solid line is printed. If 1 or more but less than the 6600 entries have a first logic state, then the printed output appears as a dot, one or more line segments and/or dots, or a lighter line.

For a 6600 nozzle embodiment and printbar memory with 120 dot line lookahead capacity, dot data for 6600×120 entries is periodically transferred from printer memory to the first memory plane 72 according to a conventional serial or parallel data transfer protocol. For a 6600 nozzle embodiment and printbar memory with 1 dot line capacity, dot data for 6600 entries is periodically transferred from printer memory to the first memory plane 72 according to the conventional serial or parallel data transfer protocol. In either case the worst case data transfer rate for maintaining a 20 kHz nozzle speed is 132 MHz. For embodiments varying in number of nozzles, the worst case data transfer rate for maintaining a desired nozzle speed varies (e.g., for 7400 nozzles, the worst case transfer rate is approximately 150 MHz).

Conventional data compression schemes are used to reduce the throughput requirement. For example, by overwriting the first memory plane 72 only for changes in value, fewer writes to the first memory plane 72 need to occur during a 50 microsecond nozzle speed period. Thus, a slower data rate could be used. Alternatively, the first memory plane 72 is cleared in one memory cycle to the second logic state (i.e., no firings), then only dot data having a first logic state is written into the first plane 72. As the average image print job operates each nozzle at approximately a 30% duty cycle, a 40 MHz data rate (i.e., 0.30×132 MHz) is adequate for image printing. As the average text print job operates each nozzle at approximately a 5% duty cycle, a less than 7 MHz data rate (i.e., 0.05×132) is adequate for text printing. By using lookahead capacity and conventional compression techniques, data throughput as low as 7 or 40 MHz can drive the printhead to a print speed capable of sustaining a 20 kHz nozzle speed.

Dot data is moved in parallel from the first plane 72 to the second plane 74 in one or more parallel transactions. Because each one first plane 72 memory location is directly coupled to a corresponding one second plane 74 memory location, the transfer can occur during one memory cycle as one large parallel transfer (e.g., 6600×1 for one dot line capacity; 792 k×1 for 120 dot line capacity).

Dot data is output from the second plane 74 to the buffers 88 and firing switches 48. To sustain the 20 kHz nozzle speed, a nozzle's dot data is to be output every 50 microseconds (i.e., 1/20000=50 microseconds). For a 6600-nozzle printhead 12 a 1-bit serial output would require a 132 MHz output data rate. However, the second plane 74 is coupled to the firing resistors via a parallel data path. In one embodiment buffers 88 provide a 30-bit parallel interface. Thus, within the 50 microsecond period 220 transfers of 30 dot datum per transfer are performed (i.e., 220 ×30=6600). A transfer rate of approximately 4.4 MHz or greater can accomplish the transfers in a timely fashion. Thus, even a modestly slow 20 MHz memory can accomplish the data throughput requirement between the second plane 74 and the nozzles 44. A line select circuit 92 addresses the second plane 74 at a the prescribed data rate (e.g., $^3$4.4 MHz) to output dot data row of 30-bits by row of 30-bits. The select circuit 92 also selects firing switches 48 and corresponding firing resistors 50 to be tied to ground through demultiplexer 94.

In a specific embodiment an internal clock on the substrate 49 generates timing signals for each nozzle 44 at the nozzle speed (e.g., approximately 20 kHz). To be within a ¼ dot tolerance all 6600 nozzle should fire within 12.5 microseconds. Thus, the preferable transfer rate from second plane 74 to buffers 88 is $^3$17.6 MHz (i.e., 4.4 MHz×4). By increasing the width of the parallel data path between the second plane 74 and buffers 88, the 17.6 MHz rating can be reduced while still maintaining a 20 kHz nozzle speed and ¼ nozzle tolerance error.

Meritorious and Advantageous Effects

One advantage of the invention is that the data throughput requirements needed to maintain print speed are substantially reduced. Whereas a conventional design would require a worst case throughput from printer memory to firing resistors of approximately b 528–592MHz, embodiments of this invention achieve (i) a worst case throughput from printer memory to printbar memory of approximately 132–150 MHz or less, and (ii) throughput from resident printbar memory to firing resistors equal to the nozzle firing speed (e.g., 20 kHz). According to the invention, print speed therefore is driven by nozzle speed, rather than by data transfer inadequacies.

Although a preferred embodiment of the invention has been illustrated and described, various alternatives, modifications and equivalents may be used. For example although specific data throughput are given, these values are defined for a 20 kHz nozzle speed. Such values would differ for different nozzle speeds. Additionally, the width of the parallel connection between the second plane 74 and firing switch array 48 also can vary. Although a 30 bit parallel interface is described wider connections may be used even up to a full 6600 or more PWA nozzle width connection. Also, the width could be less and even be a serial connection and sustain a 20 kHz nozzle speed. Therefore, the foregoing description should not be taken as limiting the scope of the inventions which are defined by the appended claims.

What is claimed is:

1. A page-wide-array printer element with printhead nozzles for ejecting ink droplets and with printbar memory for off loading dot data throughput between printer memory and printhead nozzles, comprising:

an elongated printbar for defining a printbar chamber for holding ink and defining a first surface;

a plurality of nozzle circuits, each one of said nozzle circuits defining a nozzle chamber for receiving ink from the printbar chamber and a firing resistor for ejecting ink;

a flex circuit defining a plurality of conductive paths, wherein each one of the conductive paths is electronically coupled to a corresponding one of the nozzle circuits;

a plurality of firing switches, each one of the plurality of firing switches coupled to a corresponding firing resistor by a corresponding one of the plurality of conductive paths;

a plurality of buffers, each one of the plurality of buffers coupled to a subset of the plurality of firing switches, the subset comprising multiple firing switches;

memory for storing dot data for each one of the printhead nozzles, wherein dot data for each one of the printhead nozzles is output from memory to the nozzle circuit of a corresponding one of the printhead nozzles; and a first circuit for selecting a portion of memory to output dot data to the plurality of buffers; and a second circuit for selecting a firing switch from each subset of firing switches that is to respond to the dot data stored in the plurality of buffers;

wherein the flex circuit, plurality of nozzle circuits and memory are in electrical communication and are attached to the printbar to define a page-wide-array printhead of printhead nozzles.

2. The printer element of claim 1, wherein the memory is functionally organized into a first memory plane for storing first dot data for each one of the printhead nozzles and a second memory plane for storing second dot data for each one of the printhead nozzles, and wherein second dot data for each one of the printhead nozzles is output from the second plane to the nozzle circuit of a corresponding one of the printhead nozzles via at least one of the plurality of buffers.

3. The printer element of claim 2, wherein second dot data for a first plurality of printhead nozzles are output in parallel from the second memory plane to the nozzle circuits of corresponding ones of the first plurality of printhead nozzles via at least one of the plurality of buffers.

4. The printer element of claim 2, in which each one memory location of the first memory plane is coupled in parallel with a corresponding one memory location of the second memory plane.

5. The printer element of claim 2, in which the first memory plane has at least enough capacity for storing a plurality of first dot data for multiple firing cycles of each one of the printhead nozzles, and in which the second memory plane has at least enough capacity for storing a plurality of second dot data for multiple firing cycles of each one of the printhead nozzles.

6. The printer element of claim 1, wherein the flex circuit defines a plurality of nozzle orifices, wherein the plurality of nozzle circuits are attached to the flex circuit with the nozzle chamber of said each one nozzle circuit aligned with a corresponding one of the nozzle orifices to define a corresponding plurality of printhead nozzles.

7. A method of firing printhead nozzles of an inkjet page-wide-array printer element, the printer element including a printbar with printbar memory, a plurality of buffers and an array of firing switches, the printbar memory for receiving and storing dot data from off-printer-element memory, the printbar memory, plurality of buffers and the array of firing switches are resident to the printer element, each one of the printhead nozzles comprising a nozzle chamber for receiving ink to be ejected and a firing resistor for ejecting ink from the nozzle chamber, wherein a respective firing resistor is coupled to a corresponding firing switch, and wherein each one of the plurality of buffers is coupled to a plurality of firing switches, the method comprising the steps of:

receiving dot data into a first memory plane of the printbar memory for each one of the printhead nozzles;

transferring the dot data from the first memory plane to a second memory plane of the printbar memory in parallel for each one of the printhead nozzles;

selecting a subset of the second memory plane to output to the plurality of buffers;

for each one of the plurality of buffers, selecting which one of the plurality of firing switches coupled to said one buffer is to respond to the dot data stored in said one buffer.

8. The method of claim 7, in which the step of transferring comprises transferring dot data for every printhead nozzle from the first memory plane to the second memory plane in one parallel transfer.

9. The method of claim 7, in which the step of receiving comprises the step of receiving a first plurality of dot data into a first memory plane of the printbar memory for multiple firing cycles of each one of the printhead nozzles; and in which the step of transferring comprises transferring a second plurality of dot data from the first memory plane to a second memory plane of the printbar memory for multiple firing cycles of each one of the printhead nozzles.

10. A page-wide-array printer element with printhead nozzles for ejecting ink droplets and with printbar memory for off loading dot data throughput between printer memory and printhead nozzles, comprising:

an elongated printbar for defining a printbar chamber for holding ink and defining a first surface;

a plurality of nozzle circuits, each one of said nozzle circuits defining a nozzle chamber for receiving ink from the printbar chamber;

a flex circuit defining a plurality of conductive paths, wherein each one of the conductive paths is electronically coupled to a corresponding one of the nozzle circuits; and memory for storing dot data for each one of the printhead nozzles, wherein dot data for each one of the printhead nozzles is output from memory to the nozzle circuit of a corresponding one of the printhead nozzles; and wherein the flex circuit, plurality of nozzle circuits and memory are in electrical communication and are attached to the printbar to define a page-wide-array printhead of printhead nozzles;

wherein the memory is functionally organized into a first memory plane for storing first dot data for each one of the printhead nozzles and a second memory plane for storing second dot data for each one of the printhead nozzles, and wherein second dot data for each one of the printhead nozzles is output from the second plane to the nozzle circuit of a corresponding one of the printhead nozzles; and wherein the first memory plane has at least enough capacity for storing a plurality of first dot data for multiple firing cycles of each one of the printhead nozzles, and in which the second memory plane has at least enough capacity for storing a plurality of second dot data for multiple firing cycles of each one of the printhead nozzles.

11. A method of firing printhead nozzles of an inklet page-wide-array printer element, the printer element including a printbar with resident printbar memory for receiving and storing dot data from off-printer-element memory, each one of the printhead nozzles comprising a nozzle chamber for receiving ink to be ejected and nozzle circuitry for ejecting ink from the nozzle chamber, the method comprising the steps of:

receiving a first plurality of dot data into a first memory plane of the printbar memory for multiple firings of each one of the printhead nozzles;

transferring the first plurality of dot data from the memory plane to a second memory plane of the printbar memory in parallel for multiple firings of each one of the printhead nozzles; and outputting dot data for each one of the plurality of printhead nozzles in parallel from the second memory plane to the nozzle circuitry of said each one of the plurality of printhead nozzles.

* * * * *